US010902171B1

(12) United States Patent
Cook et al.

(10) Patent No.: US 10,902,171 B1
(45) Date of Patent: Jan. 26, 2021

(54) CLOCK CROSSING INTERFACE FOR INTEGRATED CIRCUIT GENERATION

(71) Applicant: SiFive, Inc., San Mateo, CA (US)

(72) Inventors: Henry Cook, Berkeley, CA (US); Wesley Waylon Terpstra, San Mateo, CA (US); Ryan Macdonald, San Francisco, CA (US)

(73) Assignee: SiFive, Inc., San Mateo, CA (US)

( * ) Notice: Subject to any disclaimer, the term of this patent is extended or adjusted under 35 U.S.C. 154(b) by 0 days.

(21) Appl. No.: 16/506,507

(22) Filed: Jul. 9, 2019

(51) Int. Cl.
| | |
|---|---|
| *G06F 17/50* | (2006.01) |
| *G06F 30/39* | (2020.01) |
| *G06F 1/08* | (2006.01) |
| *G06F 30/396* | (2020.01) |
| *G06F 113/18* | (2020.01) |
| *G06F 115/10* | (2020.01) |
| *G06F 30/373* | (2020.01) |
| *G06F 30/327* | (2020.01) |
| *G06F 30/337* | (2020.01) |

(Continued)

(52) U.S. Cl.
CPC ............... *G06F 30/39* (2020.01); *G06F 1/08* (2013.01); *G06F 30/327* (2020.01); *G06F 30/337* (2020.01); *G06F 30/3312* (2020.01); *G06F 30/3315* (2020.01); *G06F 30/373* (2020.01); *G06F 30/396* (2020.01); *G06F 30/398* (2020.01); *G06F 2113/18* (2020.01); *G06F 2115/10* (2020.01)

(58) Field of Classification Search
CPC ............ G06F 30/3312; G06F 30/3315; G06F 30/327; G06F 30/337; G06F 30/373; G06F 30/398; G06F 30/396; G06F 30/39; G06F 2113/18; G06F 2115/10; G06F 1/08

USPC ................... 716/136, 108, 113, 134; 703/16
See application file for complete search history.

(56) References Cited

U.S. PATENT DOCUMENTS 6,249,875 B1 * 6/2001 Warren ..................... G06F 5/10
710/58
6,978,328 B1 * 12/2005 Osaka .................. H05K 1/0228
365/52

(Continued)

OTHER PUBLICATIONS

S. Verma, et al.; "Understanding Clock Domain Crossing Issues"; EE Times; Apr. 30, 2019; 5 pages; available at https://www.eetimes.com/document.asp?doc_id=1276114#.

(Continued)

*Primary Examiner* — Phallaka Kik
(74) *Attorney, Agent, or Firm* — Young Basile Hanlon & MacFarlane, P.C.

(57) ABSTRACT

Systems and methods are disclosed for generation and testing of integrated circuit designs with clock crossings between clock domains. These may allow for the rapid design and testing (e.g. silicon testing) of processors and SoCs. Clock crossings may be automatically generated between modules, inferring the values of design parameters, such as a signaling protocol (e.g. a bus protocol), directionality, and/or a clock crossing type (e.g., synchronous, rational divider, or asynchronous), of a clock crossing. For example, implicit classes may be used to generate clock crossings in a flexible manner. For example, these system and methods may be used to rapidly connect a custom processor design, including one or more IP cores, to a standard input/output shell for a SoC design to facilitate rapid silicon testing of the custom processor design.

20 Claims, 8 Drawing Sheets

(51) Int. Cl.
  *G06F 30/398* (2020.01)
  *G06F 30/3315* (2020.01)
  *G06F 30/3312* (2020.01)

(56) References Cited

U.S. PATENT DOCUMENTS

| | | | | |
|---|---|---|---|---|
| 7,093,150 | B1* | 8/2006 | Norman | G06F 1/10 |
| | | | | 713/400 |
| 8,745,561 | B1* | 6/2014 | Garg | G06F 30/00 |
| | | | | 716/113 |
| 9,639,641 | B1* | 5/2017 | Wilson | G06F 30/327 |
| 10,706,910 | B2* | 7/2020 | Ware | G11C 29/022 |
| 2005/0177357 | A1* | 8/2005 | Amatangelo | G06F 30/3312 |
| | | | | 703/16 |
| 2007/0064852 | A1* | 3/2007 | Jones | G06F 1/04 |
| | | | | 375/356 |
| 2011/0216861 | A1* | 9/2011 | Melzer | G06F 1/10 |
| | | | | 375/354 |
| 2012/0060140 | A1* | 3/2012 | Kwan | G01R 31/318357 |
| | | | | 716/136 |
| 2019/0227963 | A1* | 7/2019 | Ooi | H01L 25/18 |
| 2019/0259113 | A1* | 8/2019 | Rao | G06Q 50/184 |
| 2019/0392891 | A1* | 12/2019 | Hong | G06F 13/4282 |

OTHER PUBLICATIONS

"diplomacy: add BundleBridge for cross-module bundles"; GitHub, Jun. 6, 2018; 2 pages; available at https://github.com/chipsalliance/rocket-chip/pull/1473.

"Clock Crossings: make API more flexible with Crossing Helper #1537"; GitHub, Jul. 16, 2018; 4 pages; available at https://github.com/chipsalliance/rocket-chip/pull/1537.

"Better crossings deployed to bus and tile wrappers #1065"; GitHub, Oct. 26, 2017; 4 pages; available at https://github.com/chipsalliance/rocket-chip/pull/1065.

"Auto diplomacy bundles #993"; GitHub, Sep. 27, 2017; 5 pages; available at https://github.com/chipsalliance/rocket-chip/pull/993.

M. Su, et al.; "A General Method to Make Multi-Clock System Deterministic"; 2010 EDAA, pp. 1480-1485.

P. Narain, et al.; "Clock Domain Crossing Demystified: The Second Generation Solution for CDC Verification"; Real Intent Inc. & Sunburst Design, Inc., Mar. 13, 2008; 20 pages; available at https://www.academia.edu/5261515/Clock_Domain_Crossing_Demystified_The_Second_Generation_Solution_for CDC_Verification.

A. Hari, et al.; "A Method to Accelerate SoC Implementation Cycle by Automatically Generating CDC constraints"; Accellera Systems Initiative; 2015 Design & Verification Conference & Exhibition; 16 pages.

C. Cummings; "Clock Domain Crossing (CDC) Design & Verification Techniques Using System Verilog"; Sunburst Design, World Class Verilog & SystemVerilog Training; SNUG Boston 2008, Rev 1.0, 56 pages.

"Refactor TLBusWrapper and CrossingHelper #1548"; GitHub, Jul. 23, 2018, 3 pages; available at https://github.com/chipsalliance/rocket-chip/pull/1548.

* cited by examiner

US 10,902,171 B1

CLOCK CROSSING INTERFACE FOR INTEGRATED CIRCUIT GENERATION

TECHNICAL FIELD

This disclosure relates to a clock crossing interface to facilitate generation of integrated circuit designs.

BACKGROUND

Integrated circuits are typically designed and tested in a multi-step process that involves multiple specialized engineers performing a variety of different design and verification tasks on an integrated circuit design. A variety of internal or proprietary (e.g. company-specific) integrated circuit design tool chains are typically used by these engineers to handle different parts of the integrated circuit design workflow of using commercial electronic design automation (EDA) tools. Some integrated circuits use multiple clocks and include multiple clock domains. A clock domain crossing is circuitry used to reliably transfer digital signals from one clock domain to another. For example, clock domain crossings are described in Verma, S., et al., "Understanding Clock Domain Crossing Issues," EE Times, Dec. 24, 2007.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
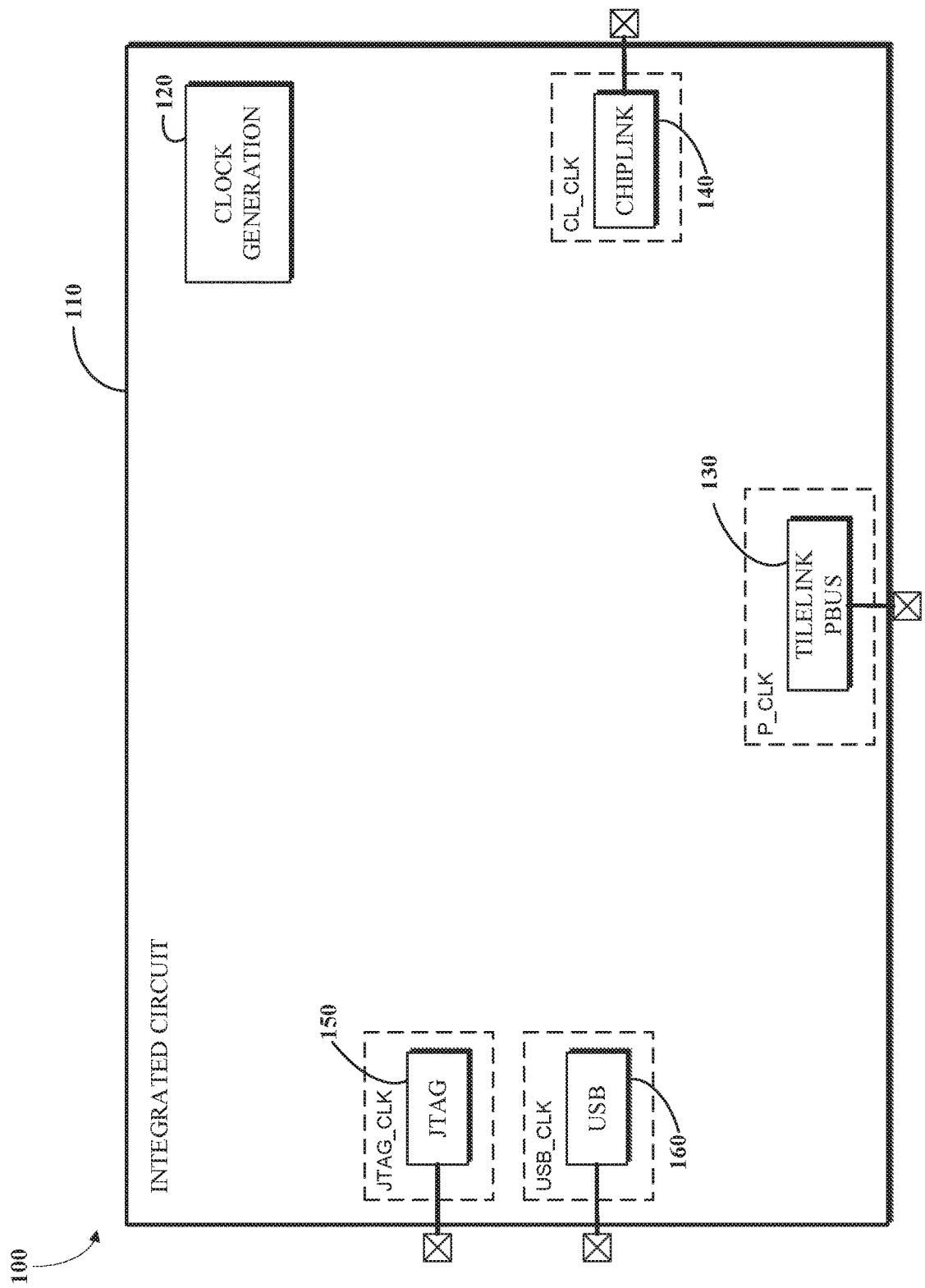
FIG. 1 is block diagram of an example of an integrated circuit design including an input/output shell.

Systems and methods for providing a clock crossing interface to facilitate generation of integrated circuit designs are described herein. A user is able to issue a command that causes automatic generation of a clock crossing between two modules in a register-transfer level representation of an integrated circuit design that are in different clock domains. Passing digital signals between different clock domains can cause problems in an integrated circuit, such as metastability, data loss, and/or data incoherency. A clock crossing includes logic (e.g., a multi-flop synchronizer, MUX recirculation, handshake, or a first in first out (FIFO) buffer) at the destination module and/or at the source module to address one or more of these problems.

The specifics of a clock crossing to be generated may be determined based on data of one or both of the modules being connected by the clock crossing. A system may automatically determine a signaling protocol (e.g., a bus protocol) for the clock crossing based on data for one or both of the modules being connected by the clock crossing. A system may automatically determine a directionality (e.g., sending or receiving) for the clock crossing based on data for one or both of the modules being connected by the clock crossing. In some implementations, a system may automatically determine a clock crossing type (e.g., synchronous, rational, or asynchronous) for the clock crossing based on data for one or both of the modules being connected by the clock crossing (e.g., based on the clock frequencies of the wo modules). In some implementations, the clock crossing type is selected based on a parameter of the command For example, a non-bus module may be connected to a bus module by adding a clock crossing. For example, two bus modules may be connected using a clock crossing. In some implementations, a first module may be connected to two other modules in different clock domains using clock crossing of different clock crossing types to the first module. For example, a module of a custom processor design may be connected to a module of an input/output shell for an integrated circuit that is a system-on-a-chip, which may enable rapid silicon testing of the custom processor design.

In a first aspect, the subject matter described in this specification can be embodied in methods that include accessing a register-transfer level data structure for an integrated circuit design; receiving a command to generate a clock crossing between a first module of the register-transfer level data structure and a second module of the register-transfer level data structure; responsive to the command, automatically determining a signaling protocol identifier for the clock crossing based on data of the second module; responsive to the command, automatically determining a directionality for the clock crossing based on data of the second module; and responsive to the command, automatically generating the clock crossing between the first module and the second module based on the signaling protocol identifier and based on the directionality to obtain a modified register-transfer level data structure.

In a second aspect, the subject matter described in this specification can be embodied in systems that include a network interface, a memory, and a processor, wherein the memory includes instructions executable by the processor to cause the system to: access a register-transfer level data structure for an integrated circuit design; receive a command to generate a clock crossing between a first module of the register-transfer level data structure and a second module of the register-transfer level data structure; responsive to the command, automatically determine a signaling protocol identifier for the clock crossing based on data of the second module; responsive to the command, automatically determine a directionality for the clock crossing based on data of the second module; and responsive to the command, automatically generate the clock crossing between the first module and the second module based on the signaling protocol identifier and based on the directionality to obtain a modified register-transfer level data structure.

In a third aspect, the subject matter described in this specification can be embodied in a non-transitory computer-readable storage medium that includes instructions that, when executed by a processor, facilitate performance of operations comprising: accessing a register-transfer level data structure for an integrated circuit design; receiving a command to generate a clock crossing between a first module of the register-transfer level data structure and a second module of the register-transfer level data structure; responsive to the command, automatically determining a signaling protocol identifier for the clock crossing based on data of the second module; responsive to the command, automatically determining a directionality for the clock crossing based on data of the second module; and responsive to the command, automatically generating the clock crossing between the first module and the second module based on the signaling protocol identifier and based on the directionality to obtain a modified register-transfer level data structure.

Some implementations may provide advantages over prior systems and methods, such as automating significant parts of integrated circuit design flow; helping to enable fast silicon testing of new processor designs when used with a system-on-a-chip input/output design; and reducing development and testing time for integrated circuits.

FIG. 1 is block diagram of an example of an integrated circuit design 100 including an input/output shell. The integrated circuit 110 includes a clock generation module 120 and a collection of interface modules (130, 140, 150, and 160) connected to pins of the integrated circuit. The interface modules include a TileLink PBus module 130; a ChipLink module 140; a JTAG module 150; and a USB module 160, which each are in their own respective clock domains. For example, the modules of this input/output shell may provide a standard interface transferring data to between one or more processors, which may be added to the integrated circuit design 100, and external devices (e.g., a silicon testing apparatus). The input/output shell of the integrated circuit design 100 can thus be used to facilitate rapid testing of a new processor design in silicon.

For example, the clock generation module 120 may include a high-frequency crystal, a phase locked loop, an oscillator, a switch, and/or a real-time clock. For example, the TileLink PBus module may include pins for mode selection, a Serial Peripheral Interface (SPI), an Inter-Integrated Circuit (I2C), a Universal Asynchronous Receiver/Transmitter (UART), a pulse width modulation (PWM), and/or General Purpose Input/Output (GPIO).

Figure 2:
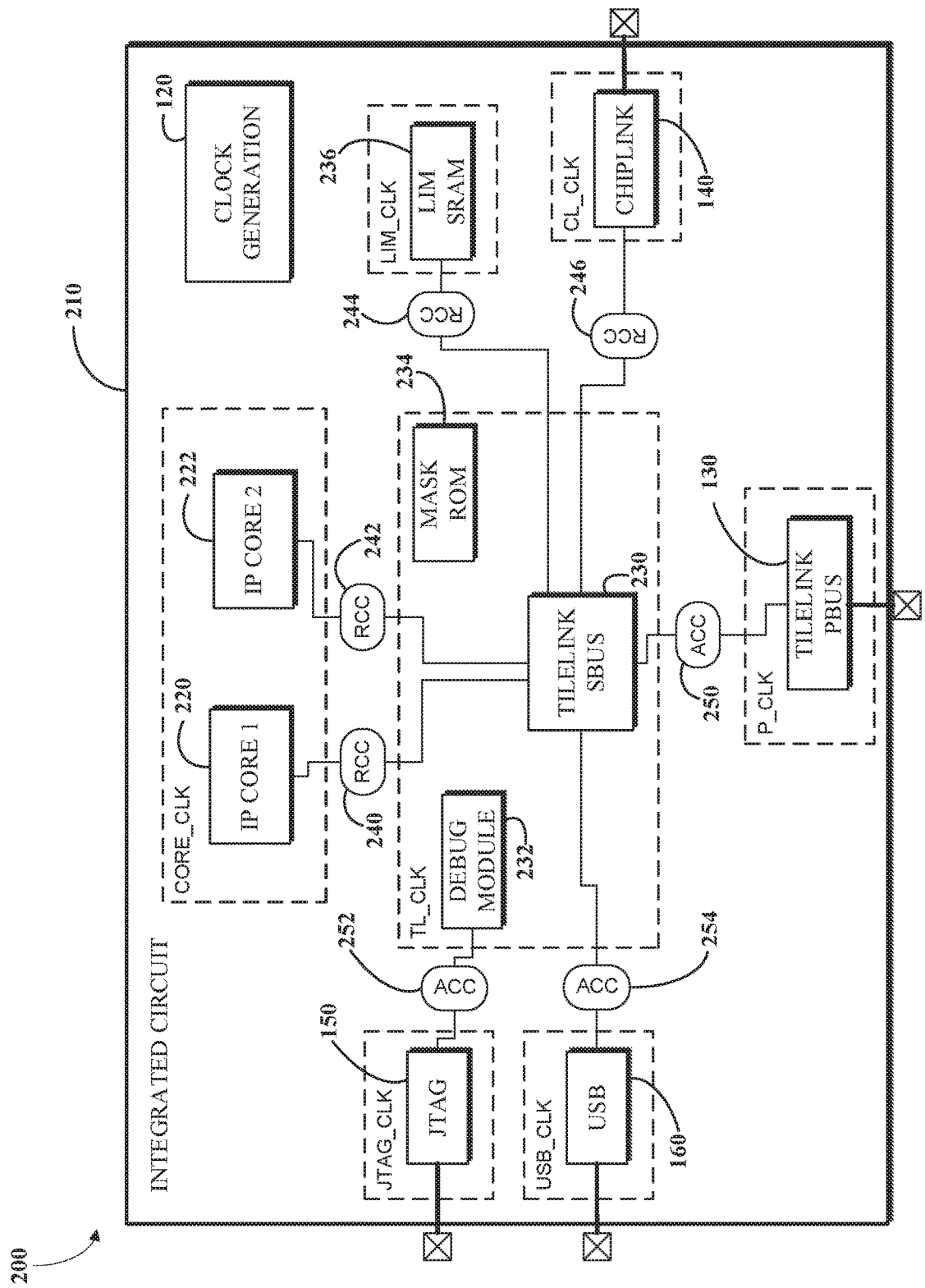
FIG. 2 is block diagram of an example of an integrated circuit design including the input/output shell and custom processor logic.

FIG. 2 is block diagram of an example of an integrated circuit design 200 including the input/output shell of FIG. 1 and custom processor logic. The integrated circuit 210 includes custom modules (220, 222, 230, 232, 234, and 236) in three clock domains: core_clk, tl_clk, and lim_clk; along with interface modules of the input/output shell (130, 140, 150, and 160) in their four respective clock domains; p_clk, cl_clk, jtag_clk, and usb_clk. A user may quickly merge the custom processor logic with the input/output shell by issuing commands to cause clock crossings to be automatically generated between modules in different clock domains of the integrated circuit 210. In this example, the custom processor logic of the integrated circuit design 200 includes a first IP core module 220 and a second IP core module 222 that are connected to a TileLink SBus module 230 by a rational clock crossing (RCC) 240 and a rational clock crossing 242. A debug module 232 in the tl_clk clock domain is connected to the JTAG module 150 in the jtag_clk clock domain by an asynchronous clock crossing (ACC) 252. A mask ROM module 234 is also included in the tl_clk clock domain and may be connected to the TileLink SBus module 230 by intra-clock domain connections (not explicitly shown in FIG. 2). A LIM SRAM module 236 in the lim_clk clock domain is connected to the TileLink SBus module 230 by a rational clock crossing 244. The ChipLink module 140 in the cl_clk clock domain is connected to the TileLink SBus module 230 by a rational clock crossing 246. The TileLink PBus module 130 in the p_clk clock domain is connected to the TileLink SBus module 230 by an asynchronous clock crossing 250. The USB module 160 in the usb_clk clock domain is connected to the TileLink SBus module 230 by an asynchronous clock crossing 254. For example, the process 500 of FIG. 5 or the process 600 of FIG. 6 may be implemented to generate the clock crossings (240, 242, 244, 246, 250, 252, and 254) between the modules of the integrated circuit design 200. The resulting integrated circuit design 200 may then be rapidly tested using system 300 of FIG. 3, the process 700 of FIG. 7 and/or the process 800 of FIG. 8.

Figure 3:
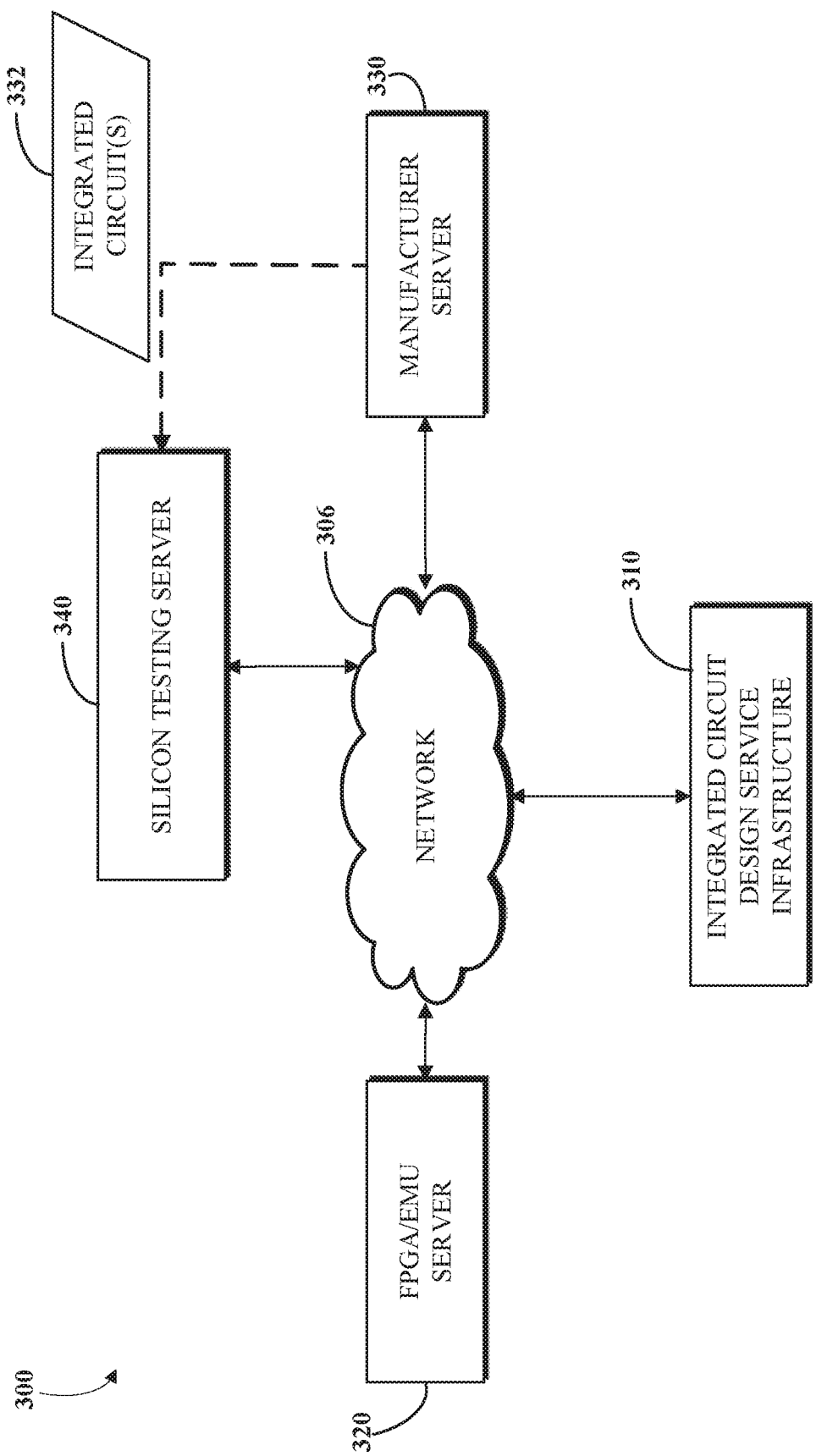
FIG. 3 is block diagram of an example of a system for facilitating design and manufacture of integrated circuits.

FIG. 3 is block diagram of an example of a system 300 for facilitating design and manufacture of integrated circuits. The system 300 includes, the network 306, the integrated circuit design service infrastructure 310, an FPGA/emulator server 320, and a manufacturer server 330. For example, a user may utilize a web client or a scripting API client to command the integrated circuit design service infrastructure 310 to automatically generate an integrated circuit design based on a set of design parameter values selected by the user for one or more template integrated circuit designs. In some implementations, a user may issue a command to the integrated circuit design service infrastructure 310 to generate a clock crossing between modules of a register-transfer level data structure for an integrated circuit.

For example, the integrated circuit design service infrastructure 310 may invoke (e.g., via network communications over the network 306) testing of the resulting design that is performed by the FPGA/emulation server 320 that is running one or more FPGAs or other types of hardware or software emulators. For example, the integrated circuit design service infrastructure 310 may invoke a test using a field programmable gate array, programmed based on a field programmable gate array emulation data structure, to obtain an emulation result. The field programmable gate array may be operating on the FPGA/emulation server 320, which may be a cloud server. Test results may be returned by the FPGA/emulation server 320 to the integrated circuit design service infrastructure 310 and relayed in a useful format to the user (e.g., via a web client or a scripting API client).

The integrated circuit design service infrastructure 310 may also facilitate the manufacture of integrated circuits using the integrated circuit design in a manufacturing facility associated with the manufacturer server 330. In some implementations, a physical design specification (e.g., a GDSII file) based on a physical design data structure for the integrated circuit is transmitted to the manufacturer server 330 to invoke manufacturing of the integrated circuit (e.g., using manufacturing equipment of the associated manufacturer). For example, the manufacturer server 330 may host a foundry tape out website that is configured to receive physical design specifications (e.g., as a GDSII file or an OASIS file) to schedule or otherwise facilitate fabrication of integrated circuits. In some implementations, the integrated circuit design service infrastructure 310 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 310 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 330 may fabricate and/or test integrated circuits based on the integrated circuit design. For example, the associated manufacturer (e.g., a foundry) may perform optical proximity correction (OPC) and similar post-tapeout/pre-production processing, fabricate the integrated circuit(s) 332, update the integrated circuit design service infrastructure 310 (e.g., via communications with a controller or a web application server) periodically or asynchronously on the status of the manufacturing process, performs appropriate testing (e.g., wafer testing) and send to packaging house for packaging. A packaging house may receive the finished wafers or dice from the manufacturer and test materials, and update the integrated circuit design service infrastructure 310 on the status of the packaging and delivery process periodically or asynchronously. In some implementations, status updates may be relayed to the user when the user checks in using the web interface and/or the controller might email the user that updates are available.

In some implementations, the resulting integrated circuits 332 (e.g., physical chips) are delivered (e.g., via mail) to a silicon testing service provider associated with a silicon testing server 340. In some implementations, the resulting integrated circuits 332 (e.g., physical chips) are installed in a system controlled by silicon testing server 340 (e.g., a cloud server) making them quickly accessible to be run and tested remotely using network communications to control the operation of the integrated circuits 332. For example, a login to the silicon testing server 340 controlling a manufactured integrated circuit 332 may be sent to the integrated circuit design service infrastructure 310 and relayed to a user (e.g., via a web client). For example, the integrated circuit design service infrastructure 310 may implement the process 700 of FIG. 7 to control testing of one or more integrated circuits 332, which may be structured based on a register-transfer level data structure (e.g., a modified register-transfer level data structure determined using the process 500 of FIG. 5 or the process 600 of FIG. 6). For example, the integrated circuit design service infrastructure 310 may implement the process 800 of FIG. 8 to control fabrication and silicon testing of one or more integrated circuits 332, which may be structured based on a register-transfer level data structure (e.g., a modified register-transfer level data structure determined using the process 500 of FIG. 5 or the process 600 of FIG. 6).

Figure 4:
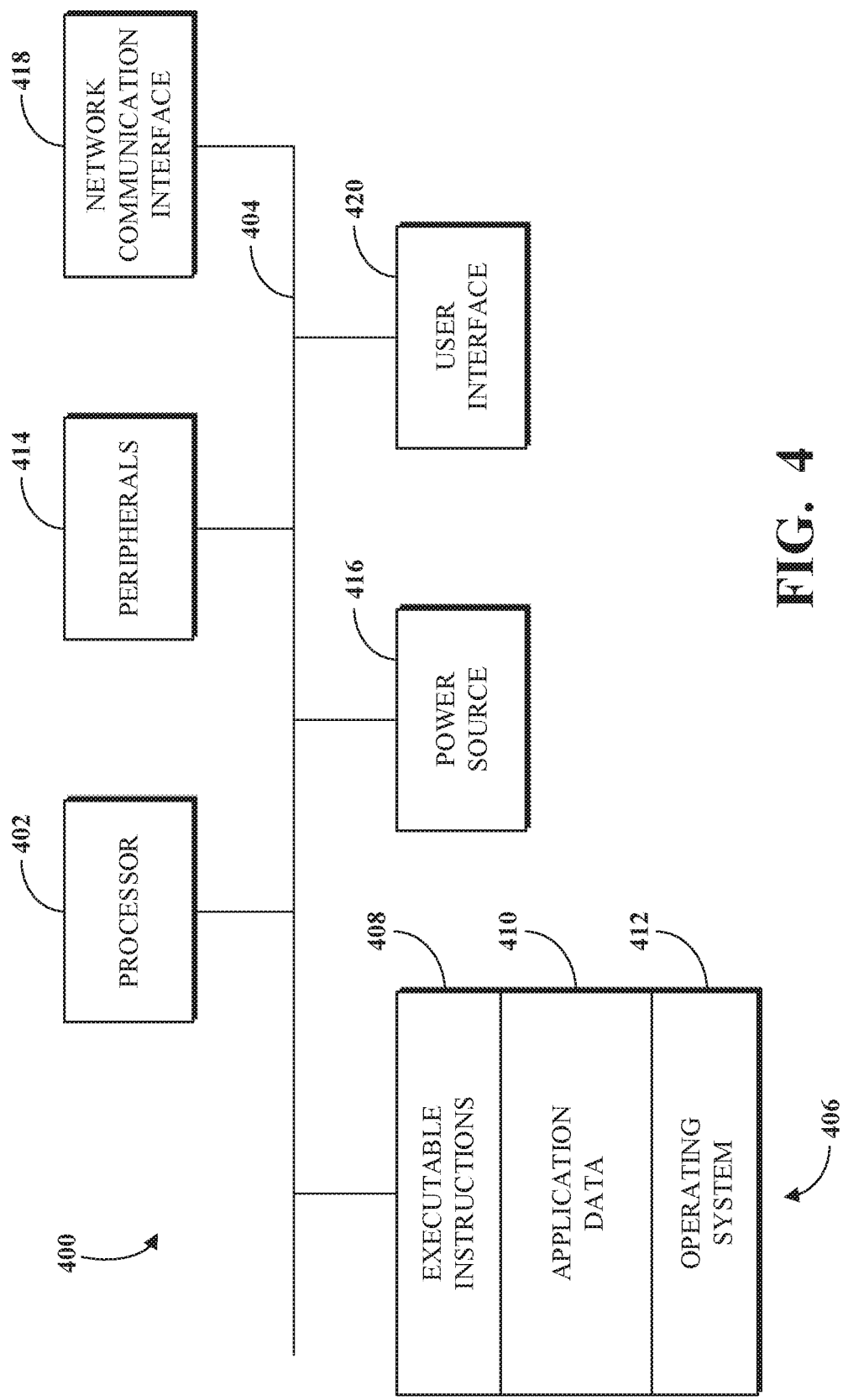
FIG. 4 is block diagram of an example of a system for facilitating design of integrated circuits.

FIG. 4 is block diagram of an example of a system 400 for facilitating design of integrated circuits. The system 400 is an example of an internal configuration of a computing device that may be used to implement the integrated circuit design service infrastructure 310 as a whole or one or more components of the integrated circuit design service infrastructure 310 of the system 300 shown in FIG. 3. The system 400 can include components or units, such as a processor 402, a bus 404, a memory 406, peripherals 414, a power source 416, a network communication interface 418, a user interface 420, other suitable components, or a combination thereof.

The processor 402 can be a central processing unit (CPU), such as a microprocessor, and can include single or multiple processors having single or multiple processing cores. Alternatively, the processor 402 can include another type of device, or multiple devices, now existing or hereafter developed, capable of manipulating or processing information. For example, the processor 402 can include multiple processors interconnected in any manner, including hardwired or networked, including wirelessly networked. In some implementations, the operations of the processor 402 can be distributed across multiple physical devices or units that can be coupled directly or across a local area or other suitable type of network. In some implementations, the processor 402 can include a cache, or cache memory, for local storage of operating data or instructions.

The memory 406 can include volatile memory, non-volatile memory, or a combination thereof. For example, the memory 406 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 406 can include another type of device, or multiple devices, now existing or hereafter developed, capable of storing data or instructions for processing by the processor 402. The processor 402 can access or manipulate data in the memory 406 via the bus 404. Although shown as a single block in FIG. 4, the memory 406 can be implemented as multiple units. For example, a system 400 can include volatile memory, such as RAM, and persistent memory, such as a hard drive or other storage.

The memory 406 can include executable instructions 408, data, such as application data 410, an operating system 412, or a combination thereof, for immediate access by the processor 402. The executable instructions 408 can include, for example, one or more application programs, which can be loaded or copied, in whole or in part, from non-volatile memory to volatile memory to be executed by the processor 402. The executable instructions 408 can be organized into programmable modules or algorithms, functional programs, codes, code segments, or combinations thereof to perform various functions described herein. For example, the executable instructions 408 can include instructions executable by the processor 402 to cause the system 400 to automatically, in response to a command, generate an integrated circuit design and associated test results based on a design parameters data structure. The application data 410 can include, for example, user files, database catalogs or dictionaries, configuration information or functional programs, such as a web browser, a web server, a database server, or a combination thereof. The operating system 412 can be, for example, Microsoft Windows®, Mac OS X®, or Linux®; an operating system for a small device, such as a smartphone or tablet device; or an operating system for a large device, such as a mainframe computer. The memory 406 can comprise one or more devices and can utilize one or more types of storage, such as solid state or magnetic storage.

The peripherals 414 can be coupled to the processor 402 via the bus 404. The peripherals 414 can be sensors or detectors, or devices containing any number of sensors or detectors, which can monitor the system 400 itself or the environment around the system 400. For example, a system 400 can contain a geospatial location identification unit, such as a global positioning system (GPS) location unit. As another example, a system 400 can contain a temperature sensor for measuring temperatures of components of the system 400, such as the processor 402. Other sensors or detectors can be used with the system 400, as can be contemplated. In some implementations, the power source 416 can be a battery, and the system 400 can operate independently of an external power distribution system. Any of the components of the system 400, such as the peripherals 414 or the power source 416, can communicate with the processor 402 via the bus 404.

The network communication interface 418 can also be coupled to the processor 402 via the bus 404. In some implementations, the network communication interface 418 can comprise one or more transceivers. The network communication interface 418 can, for example, provide a connection or link to a network, such as the network 306, via a network interface, which can be a wired network interface, such as Ethernet, or a wireless network interface. For example, the system 400 can communicate with other devices via the network communication interface 418 and the network interface using one or more network protocols, such as Ethernet, TCP, IP, power line communication (PLC), WiFi, infrared, GPRS, GSM, CDMA, or other suitable protocols.

A user interface 420 can include a display; a positional input device, such as a mouse, touchpad, touchscreen, or the like; a keyboard; or other suitable human or machine interface devices. The user interface 420 can be coupled to the processor 402 via the bus 404. Other interface devices that permit a user to program or otherwise use the system 400 can be provided in addition to or as an alternative to a display. In some implementations, the user interface 420 can include a display, which can be a liquid crystal display (LCD), a cathode-ray tube (CRT), a light emitting diode (LED) display (e.g., an OLED display), or other suitable display. In some implementations, a client or server can omit the peripherals 414. The operations of the processor 402 can be distributed across multiple clients or servers, which can be coupled directly or across a local area or other suitable type of network. The memory 406 can be distributed across multiple clients or servers, such as network-based memory or memory in multiple clients or servers performing the operations of clients or servers. Although depicted here as a single bus, the bus 404 can be composed of multiple buses, which can be connected to one another through various bridges, controllers, or adapters.

Figure 5:
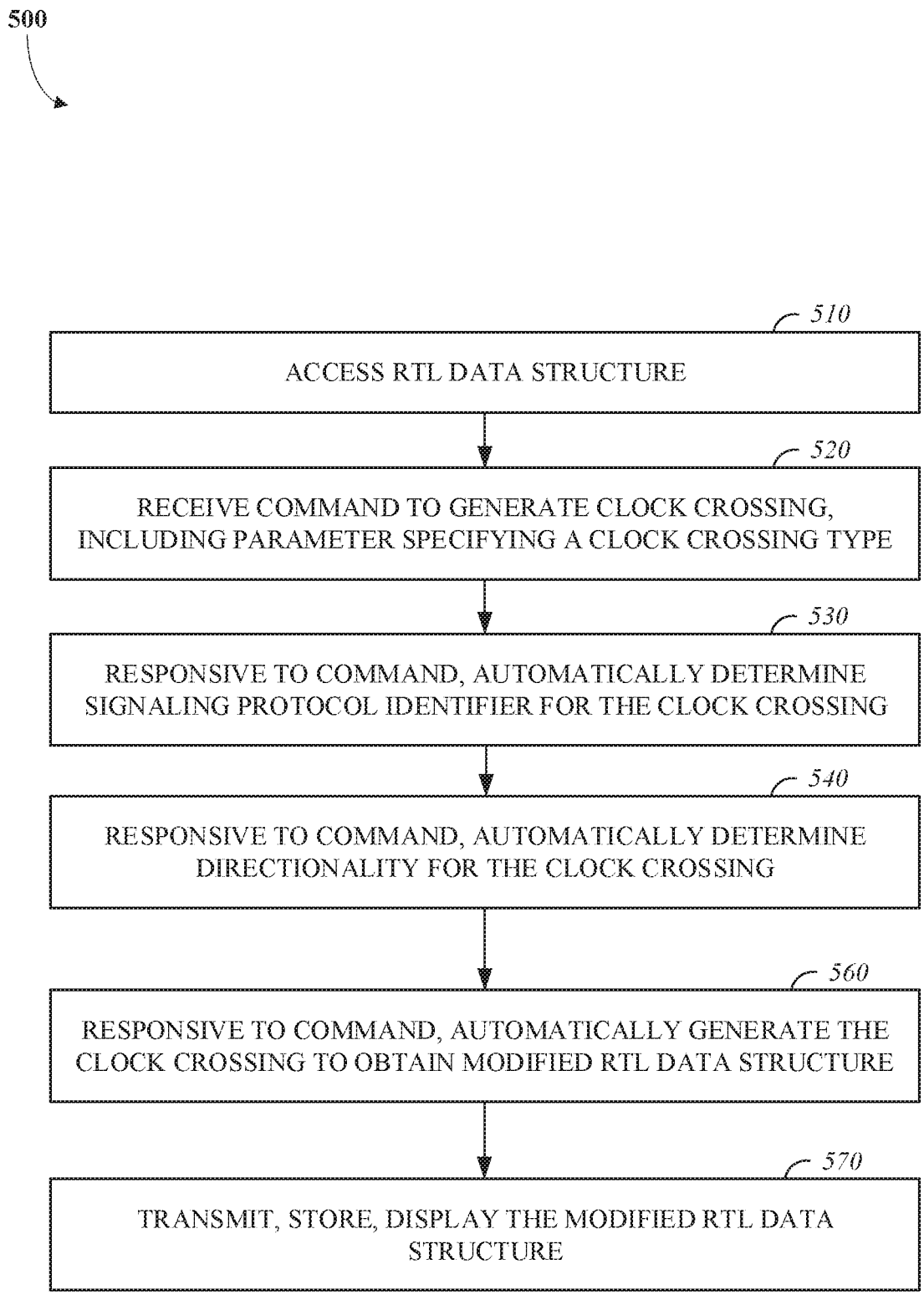
FIG. 5 is flow chart of an example of a process for generating a clock crossing of a clock crossing type in an integrated circuit design.

FIG. 5 is flow chart of an example of a process 500 for generating a clock crossing of a clock crossing type in an integrated circuit design. The process 500 includes accessing 510 a register-transfer level data structure for an integrated circuit design; receiving 520 a command to generate a clock crossing between a first module of the register-transfer level data structure and a second module of the register-transfer level data structure; responsive to the command, automatically determining 530 a signaling protocol identifier for the clock crossing based on data of the second module; responsive to the command, automatically determining 540 a directionality for the clock crossing based on data of the second module; responsive to the command, automatically generating 560 the clock crossing between the first module and the second module based on the signaling protocol identifier and based on the directionality to obtain a modified register-transfer level data structure; and transmitting, storing, or displaying 570 the modified register-transfer level data structure. For example, the process 500 may be implemented by the system 300 of FIG. 3. For example, the process 500 may be implemented by the system 400 of FIG. 4.

The process 500 includes accessing 510 a register-transfer level data structure (e.g., a file, a database, a repository, or a bitstream) for an integrated circuit design. The register-transfer level data structure includes a logical description of an integrated circuit design. For example, the integrated circuit design may be of an IP core. For example, the integrated circuit design may be of a processor. For example, the integrated circuit design may be of a system-on-a-chip. In some implementations, the register-transfer level data structure may describe a system-on-a-chip including a custom processor and an input/output shell configured to transfer to and/or from devices external to the system-on-a-chip. For example, the register-transfer level data structure may describe the integrated circuit of 210 of FIG. 2. For example, the register-transfer level data structure may be accessed 510 by receiving the register-transfer level data structure (e.g., via network communications using the network communications interface 418). For example, the register-transfer level data structure may be accessed 510 by reading the register-transfer level data structure from memory (e.g., reading from the memory 406 via the bus 404).

The process 500 includes receiving 520 a command to generate a clock crossing between a first module of the register-transfer level data structure and a second module of the register-transfer level data structure. The command may include a parameter specifying a clock crossing type (e.g., synchronous, rational, or asynchronous). For example, the command may identify the first module and the second module as two modules of the integrated circuit design to be connected with a clock crossing. For example, the command may include a call to method of the first module or a method of the second module. In some implementations, the command may have been generated using a graphical user interface that displays graphical representations of the modules of the register-transfer level data structure. For example, the command may be part of an application programming interface (API). For example, the command may be received 520 via a user interface (e.g., the user interface 420). For example, the command may be received 520 via a network interface (e.g., using the network communications interface 418). In some implementations, the command is generated as a result of a user interface interaction by a human user. In some implementations, the command is generated by an automatically by an EDA design flow.

The process 500 includes, responsive to the command, automatically determining 530 a signaling protocol identifier for the clock crossing based on data of the second module. The signaling protocol identifier may identify a signaling protocol (e.g., a bus protocol) to be used on the clock crossing. For example, the signaling protocol used by a clock crossing may be the AMBA AXI4 protocol, the TileLink protocol, or an interrupt protocol. For example, the signaling protocol identifier may include text, an integer, or some other data that may be mapped to particular signaling protocol. In some implementations, the signaling protocol identifier for the clock crossing is determined 530 based on a bus protocol of the second module (e.g., where the second module is a bus). In some implementations, the signaling protocol identifier for the clock crossing is determined 530 based on data of the first module. For example, the signaling protocol identifier for the clock crossing may be determined 530 as corresponding to a signaling protocol that is common to the first module and the second module. For example, determining 530 the signaling protocol identifier for the clock crossing may include accessing a signaling protocol identifier of the first module and/or a signaling protocol identifier of the second module.

The process 500 includes, responsive to the command, automatically determining 540 a directionality (e.g., sending vs. receiving or master vs. slave) for the clock crossing based on data of the second module. For example, the directionality of the clock crossing may be determined 540 as receiving at the first module and sending from the second module. For example, the directionality of the clock crossing may be determined 540 as sending from the first module and receiving at the second module. For example, where the second module is a bus, the directionality of the clock crossing may be determined 540 based on whether the first module is configured to be a master or a slave on the bus.

The process 500 includes, responsive to the command, automatically generating 560 the clock crossing between the first module and the second module based on the signaling protocol identifier and based on the directionality to obtain a modified register-transfer level data structure. For example, the clock crossing may be automatically generated 560 based on the clock crossing type (e.g., synchronous, rational, or asynchronous) specified by the command. In some implementations, generating 560 the clock crossing includes using an implicit class (e.g., an implicit class defined in the SCALA language) that is invoked using the signaling protocol identifier. In some implementations, generating 560 the clock crossing includes using an auto-punching wires method to connect the first module to the second module. For example, the clock crossing may include a logic circuit added to the first module and a logic circuit added to the second module to facilitate passing of signals on one or more conductors across a clock domain boundary. For example, a clock crossing may be generated 560 to include multiple re-synchronization flip-flops in the receiving module (e.g., the first module or the second module). For example, a clock crossing may be generated 560 to include logic for a MUX recirculation synchronizer in the receiving module (e.g., the first module or the second module). For example, a clock crossing with an asynchronous clock crossing type may be generated 560 to include logic for a FIFO in the receiving module (e.g., the first module or the second module). For example, a clock crossing with an asynchronous clock crossing type may be generated 560 to include logic for handshake in the receiving module and the sending module (e.g., the first module or the second module). The modified register-transfer level data structure (e.g., a file, a database, a repository, or a bitstream) includes the generated 560 clock crossing.

For example, the second module may be a bus module. For example, the first module may be a processor module and it may be connected by the clock crossing to a bus module (e.g., a TileLink bus) that is in a different clock domain of the integrated circuit (e.g., a system-on-a-chip). In some implementations, the first module is part of a custom processor design and second module is part of input/output shell (e.g., the input/output shell of FIG. 1). For example, the first module may include an IP core and the second module may be a component of an input/output shell for a system-on-a-chip design. In some implementations, the first module and the second module are both bus modules. For example, the clock crossing may be generated 560 to include logic in the first module and/or the second module to convert signals from a first bus protocol to a second compatible bus protocol and vice versa.

The process 500 includes transmitting, storing, or displaying 570 the modified register-transfer level data structure (e.g., a file, a database, a repository, or a bitstream). For example, the register-transfer level data structure may be transmitted 570 to an external device (e.g., a personal computing device) for display or storage. For example, the register-transfer level data structure may be stored 570 in memory (e.g., the memory 406). For example, register-transfer level data structure may be displayed 570 in a user interface (e.g., the user interface 420). For example, the register-transfer level data structure may be transmitted 570 via a network communications interface (e.g., the network communications interface 418).

Although the process 500 is shown as a series of operations for clarity, implementations of the process 500 or any other technique, process, or algorithm described in connection with the implementations disclosed herein can be performed in various orders or concurrently. Additionally, operations in accordance with this disclosure can be performed with other operations not presented and described herein. For example, the process 500 of FIG. 5 may repeated to receive 520 additional commands to add additional clock crossings to the modified register-transfer level data structure. Furthermore, one or more aspects of the systems and techniques described herein can be omitted. For example, operation 530 or the operation 540 may be omitted from the process 500 where the signaling protocol identifier and/or the directionality for the clock crossing are provided as parameters of the command received 520.

The process 500 may enable the generation of multiple clock crossings to/from a module that are of different clock crossing types. For example, the process 500 may be repeated such that the command is a first command and the clock crossing is a first clock crossing, and the repeated process may include receiving 510 a second command to generate a second clock crossing between the first module of the register-transfer level data structure and a third module of the register-transfer level data structure; responsive to the second command, automatically determining 530 a signaling protocol identifier for the second clock crossing based on data of the third module; responsive to the second command, automatically determining 540 a directionality for the second clock crossing based on data of the third module; and responsive to the second command, automatically generating 560 the second clock crossing between the first module and the third module based on the signaling protocol identifier for the second clock crossing and based on the directionality for the second clock crossing to obtain the modified register-transfer level data structure. The second clock crossing may have a different clock crossing type (e.g., synchronous and rational, or rational and asynchronous) than the first clock crossing. For example a module may be connected to two different buses in different clock domains using different types of clock crossings.

Figure 6:
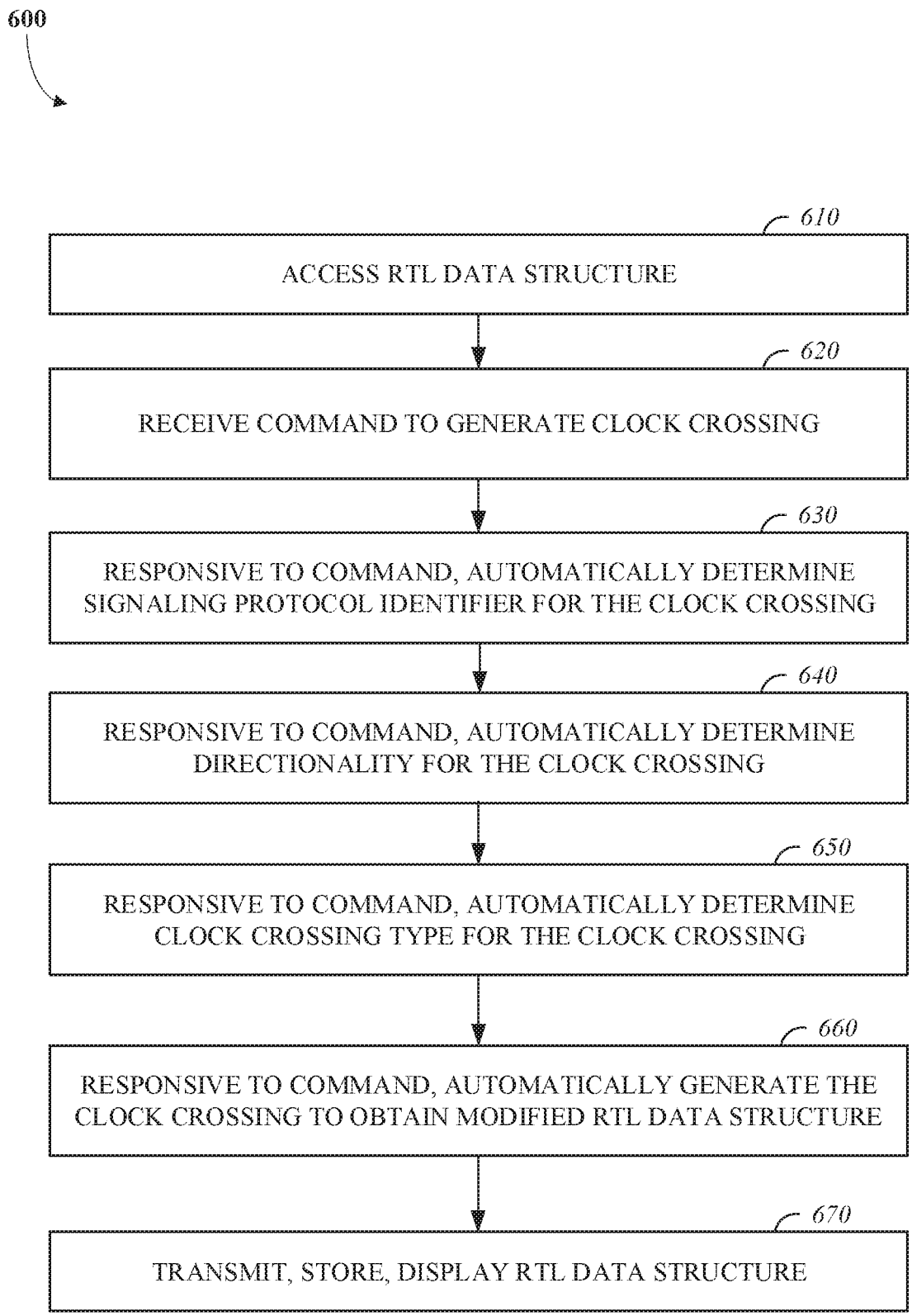
FIG. 6 is flow chart of an example of a process for generating a clock crossing in an integrated circuit design.

FIG. 6 is flow chart of an example of a process 600 for generating a clock crossing in an integrated circuit design. In this example, the clock crossing type (e.g., synchronous, rational, or asynchronous) of the clock crossing is automatically determined based on data of one or more of the modules being connected by the clock crossing. The process 600 includes accessing 610 a register-transfer level data structure for an integrated circuit design; receiving 620 a command to generate a clock crossing between a first module of the register-transfer level data structure and a second module of the register-transfer level data structure; responsive to the command, automatically determining 630 a signaling protocol identifier for the clock crossing based on data of the second module; responsive to the command, automatically determining 640 a directionality for the clock crossing based on data of the second module; responsive to the command, automatically determining 650 a clock crossing type for the clock crossing based on a clock frequency of the first module and based on a clock frequency of the second module; responsive to the command, automatically generating 660 the clock crossing between the first module and the second module based on the signaling protocol identifier, based on the directionality, and based on the clock crossing type to obtain a modified register-transfer level data structure; and transmitting, storing, or displaying 670 the modified register-transfer level data structure. For example, the process 600 may be implemented by the system 300 of FIG. 3. For example, the process 600 may be implemented by the system 400 of FIG. 4.

The process 600 includes accessing 610 a register-transfer level data structure (e.g., a file, a database, a repository, or a bitstream) for an integrated circuit design. The register-transfer level data structure includes a logical description of an integrated circuit design. For example, the integrated circuit design may be of an IP core. For example, the integrated circuit design may be of a processor. For example, the integrated circuit design may be of a system-on-a-chip. In some implementations, the register-transfer level data structure may describe a system-on-a-chip including a custom processor and an input/output shell configured to transfer to and/or from devices external to the system-on-a-chip. For example, the register-transfer level data structure may describe the integrated circuit 210 of FIG. 2. For example, the register-transfer level data structure may be accessed 610 by receiving the register-transfer level data structure (e.g., via network communications the network communications interface 418). For example, the register-transfer level data structure may be accessed 610 by reading the register-transfer level data structure from memory (e.g., reading from the memory 406 via the bus 404).

The process 600 includes receiving 620 a command to generate a clock crossing between a first module of the register-transfer level data structure and a second module of the register-transfer level data structure. For example, the command may identify the first module and the second module as two modules of the integrated circuit design to be connected with a clock crossing. For example, the command may include a call to a method of the first module or a method of the second module. In some implementations, the command may have been generated using a graphical user interface that displays graphical representations of the modules of the register-transfer level data structure. For example, the command may be part of an application programming interface (API). For example, the command may be received 620 via a user interface (e.g., the user interface 420). For example, the command may be received 620 via a network interface (e.g., using the network communications interface 418). In some implementations, the command is generated as a result of a user interface interaction by a human user. In some implementations, the command is generated by an automatically by an EDA design flow.

The process 600 includes, responsive to the command, automatically determining 630 a signaling protocol identifier for the clock crossing based on data of the second module. The signaling protocol identifier may identify a signaling protocol (e.g., a bus protocol) to be used on the clock crossing. For example, the signaling protocol used by a clock crossing may be the AMBA AXI4 protocol, the TileLink protocol, or an interrupt protocol. For example, the signaling protocol identifier may include text, an integer, or some other data that may be mapped to particular signaling protocol. In some implementations, the signaling protocol identifier for the clock crossing is determined 630 based on a bus protocol of the second module (e.g., where the second module is a bus). In some implementations, the signaling protocol identifier for the clock crossing is determined 630 based on data of the first module. For example, the signaling protocol identifier for the clock crossing may be determined 630 as corresponding to a signaling protocol that is common to (e.g., supported by) the first module and the second module. For example, determining 630 the signaling protocol identifier for the clock crossing may include accessing a signaling protocol identifier of the first module and/or a signaling protocol identifier of the second module.

The process 600 includes, responsive to the command, automatically determining 640 a directionality (e.g., sending vs. receiving or master vs. slave) for the clock crossing based on data of the second module. For example, the directionality of the clock crossing may be determined 640 as receiving at the first module and sending from the second module. For example, the directionality of the clock crossing may be determined 640 as sending from the first module and receiving at the second module. For example, where the second module is a bus module, the directionality of the clock crossing may be determined 640 based on whether the first module is configured to be a master or a slave on the bus.

The process 600 includes, responsive to the command, automatically determining 650 a clock crossing type for the clock crossing based on a clock frequency of the first module and based on a clock frequency of the second module. In some implementations, the clock crossing type is determined as the simplest (e.g., smallest area or lowest power) applicable clock crossing type given the clock frequencies of the two modules. For example, where the clock frequencies of the two modules being connected are the same, the clock crossing type may be determined 650 to be synchronous. For example, where the clock frequencies of the two modules being connected are different but related by a rational divisor, he clock crossing type may be determined 650 to be rational. For example, where the clock frequencies of the two modules being connected are not related by a rational divisor, the clock crossing type may be determined 650 to be asynchronous.

The process 600 includes, responsive to the command, automatically generating 660 the clock crossing between the first module and the second module based on the signaling protocol identifier and based on the directionality to obtain a modified register-transfer level data structure. For example, the clock crossing may be automatically generated 660 based on the determined 650 clock crossing type (e.g., synchronous, rational, or asynchronous). In some implementations, generating 660 the clock crossing includes using an implicit class (e.g., an implicit class defined in the SCALA language) that is invoked using the signaling protocol identifier. In some implementations, generating 660 the clock crossing includes using an auto-punching wires method to connect the first module to the second module. For example, the clock crossing may include a logic circuit added to the first module and a logic circuit added to the second module to facilitate passing of signals on one or more conductors across a clock domain boundary. For example, a clock crossing may be generated 660 to include multiple re-synchronization flip-flops in the receiving module (e.g., the first module or the second module). For example, a clock crossing may be generated 660 to include logic for a MUX recirculation synchronizer in the receiving module (e.g., the first module or the second module). For example, a clock crossing with an asynchronous clock crossing type may be generated 660 to include logic for a FIFO in the receiving module (e.g., the first module or the second module). For example, a clock crossing with an asynchronous clock crossing type may be generated 660 to include logic for handshake in the receiving module and the sending module (e.g., the first module or the second module). The modified register-transfer level data structure (e.g., a file, a database, a repository, or a bitstream) includes the generated 660 clock crossing.

For example, the second module may be a bus module. For example, the first module may be a processor module and it may be connected by the clock crossing to a bus module (e.g., a TileLink bus) that is in a different clock domain of the integrated circuit (e.g., a system-on-a-chip). In some implementations, the first module is part of a custom processor design and second module is part of input/output shell (e.g., the input/output shell of FIG. 1). For example, the first module may include an IP core and the second module may be a component of an input/output shell for a system-on-a-chip design. In some implementations, the first module and the second module are both bus modules. For example, the clock crossing may be generated 660 to include logic in the first module and/or the second module to convert signals from a first bus protocol to a second compatible bus protocol and vice versa.

The process 600 includes transmitting, storing, or displaying 670 the modified register-transfer level data structure (e.g., a file, a database, a repository, or a bitstream). For example, the register-transfer level data structure may be transmitted 670 to an external device (e.g., a personal computing device) for display or storage. For example, the register-transfer level data structure may be stored 670 in memory (e.g., the memory 406). For example, register-transfer level data structure may be displayed 670 in a user interface (e.g., the user interface 420). For example, the register-transfer level data structure may be transmitted 670 via a network communications interface (e.g., the network communications interface 418).

Although the process 600 is shown as a series of operations for clarity, implementations of the process 600 or any other technique, process, or algorithm described in connection with the implementations disclosed herein can be performed in various orders or concurrently. Additionally, operations in accordance with this disclosure can be performed with other operations not presented and described herein. For example, the process 600 of FIG. 6 may repeated to receive 620 additional commands to add additional clock crossings to the modified register-transfer level data structure. Furthermore, one or more aspects of the systems and techniques described herein can be omitted. For example, operation 630 or the operation 640 may be omitted from the process 600 where the signaling protocol identifier and/or the directionality for the clock crossing are provided as parameters of the command received 620.

The process 600 may enable the generation of multiple clock crossings to/from a module that are of different clock crossing types. For example, the process 600 may be repeated such that the command is a first command and the clock crossing is a first clock crossing, and the repeated process may include receiving 620 a second command to generate a second clock crossing between the first module of the register-transfer level data structure and a third module of the register-transfer level data structure; responsive to the second command, automatically determining 630 a signaling protocol identifier for the second clock crossing based on data of the third module; responsive to the second command, automatically determining 640 a directionality for the second clock crossing based on data of the third module; responsive to the second command, automatically determining 650 a clock crossing type for the second clock crossing based on a clock frequency of the first module and based on a clock frequency of the third module; and responsive to the second command, automatically generating 660 the second clock crossing between the first module and the third module based on the signaling protocol identifier for the second clock crossing and based on the directionality for the second clock crossing to obtain the modified register-transfer level data structure. The second clock crossing may have a different clock crossing type (e.g., synchronous and rational, or rational and asynchronous) than the first clock crossing. For example a module may be connected to two different buses in different clock domains using different types of clock crossings.

Figure 7:
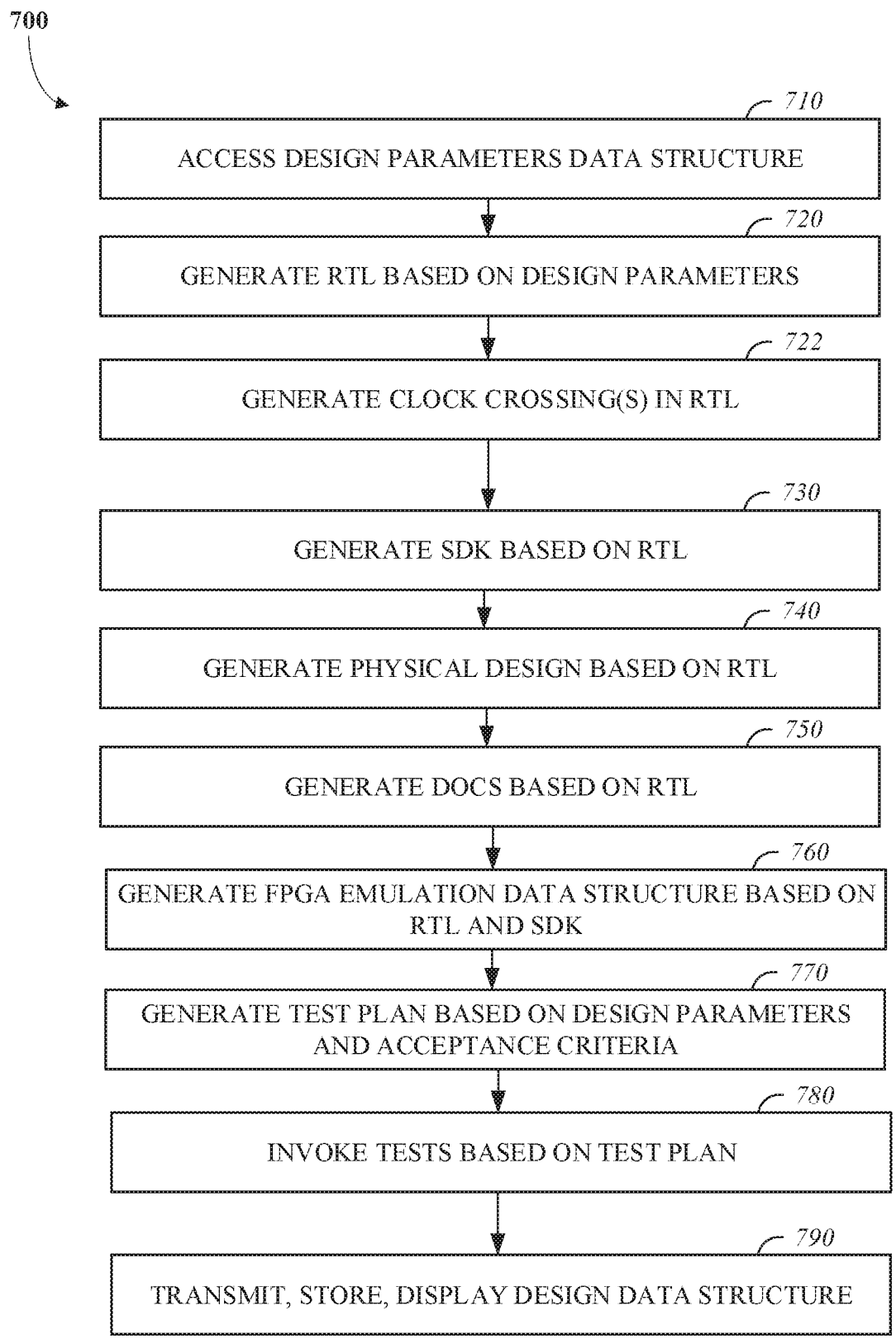
FIG. 7 is flow chart of an example of a process for facilitating design of integrated circuits.

FIG. 7 is flow chart of an example of a process 700 for facilitating design of integrated circuits. The process 700 includes accessing 710 a design parameters data structure; generating 720 a register-transfer level data structure for an integrated circuit based on the design parameters data structure; generating 722 one or more clock crossings between modules of the register-transfer level data structure to obtain a modified register-transfer level data structure; generating 730 a software development kit for the integrated circuit based on the modified register-transfer level data structure; generating 740 a physical design data structure for the integrated circuit based on the modified register-transfer level data structure; generating 750 documentation for the integrated circuit based on the modified register-transfer level data structure; generating 760 a field programmable gate array emulation data structure for the integrated circuit based on the modified register-transfer level data structure and the software development kit; generating 770 a test plan for an integrated circuit based on the design parameters data structure and acceptance criteria; invoking 780 tests for the integrated circuit based on the test plan, the modified register-transfer level data structure, the software development kit, and the physical design data structure to obtain a set of test results; and transmitting, storing, or displaying 790 a design data structure based on the modified register-transfer level data structure, the software development kit, the physical design data structure, and the test results. The process 700 may automatically generate and test an integrated circuit design conforming to design parameter values in a design parameters data structure in response to a single command (e.g., a build command). For example, the process 700 may be implemented by the integrated circuit design service infrastructure 310 of FIG. 3. For example, the process 700 may be implemented by the system 400 of FIG. 4. For example, the process 700 may be used to quickly incorporate a modular processor design with an input/output shell (e.g., the input/output shell of the integrated circuit design 100 of FIG. 1), including connecting modules of the design using automatically generated clock crossings, in a system-on-a-chip design that can be rapidly tested. This approach may reduce processor development time, reduce the costs of testing a design, and/or improve the quality of test results.

The process 700 includes accessing 710 a design parameters data structure (e.g., a file, a database, a repository, or a bitstream). The design parameters data structure includes values of design parameters of an integrated circuit design. For example, the integrated circuit design may be of an IP core. For example, the integrated circuit design may be of a system-on-a-chip. For example, the design parameters data structure may include a JSON file. For example the design parameters of the design parameters data structure may include whether privilege modes are supported, whether multiply extension is supported, whether floating point extension is supported, whether error-correcting codes are supported in on-chip memory, the size of an instruction cache, an associativity of the instruction cache, a size of a data subsystem in on-chip memory, whether a port (e.g., a front port, a system port, a peripheral port, or a memory port) are included, a count of memory port channels, a port communication protocol selection, a bus width, a count of physical memory protection units, whether JTAG debugging is supported, a count of hardware breakpoints, whether instruction tracing is supported, whether debug direct memory access is supported, a count of local interrupts, whether a platform level interrupt controller is supported, a count of interrupt priority levels, a count of global interrupts, whether branch prediction is supported, a count of branch target buffer entries, a count of branch history table entries, and/or a selection of a manufacturing process. For example, the design parameters data structure may be accessed 710 by receiving the design parameters data structure (e.g., via network communications with a web client or a scripting API client using the network communications interface 418). For example, the design parameters data structure may be accessed 710 by reading the design parameters data structure from memory (e.g., reading from the memory 406 via the bus 404).

The process 700 includes generating 720 a register-transfer level data structure for an integrated circuit based on the design parameters data structure. For example, design parameters data structure may include a JSON file listing identifiers of design parameters and corresponding values. In some implementations, the design parameters data structure also includes an indication (e.g., a pointer, a name, or another identifier) that identifies a template integrated circuit design that the design parameters modify. For example, the template integrated circuit design may include modular design data structures that adhere to conventions for facilitating modular design. For example, generating 720 the register-transfer level data structure for the integrated circuit based on the design parameters data structure may include invoking a register-transfer level service with data based on the design parameters data structure.

For example, the register-transfer level data structure may include one or more Verilog files. The register-transfer level data structure may include updated configuration settings to drive later stages of an integrated circuit design pipeline. In some implementations, the register-transfer level data structure includes a memory map, one or more port assignments, and floorplan information.

The register-transfer level data structure (e.g., a register-transfer level file) may be automatically generated 720 based on the design parameters data structure using tools, such as Scala, Chisel, Diplomacy, and/or FIRRTL. For example, generating 720 the register-transfer level data structure for the integrated circuit may include executing Scala code to read the design parameters data structure and dynamically generate a circuit graph. In some implementations, generating 720 the register-transfer level data structure for the integrated circuit includes invoking a Diplomacy package in Chisel to determine a bus protocol for the integrated circuit.

The process 700 includes generating 722 one or more clock crossings between modules of the register-transfer level data structure to obtain a modified register-transfer level data structure. For example, the process 500 of FIG. 5 may be implemented to generate 722 the one or more clock crossings in the modified register-transfer level data structure. For example, the process 600 of FIG. 6 may be implemented to generate 722 the one or more clock crossings in the modified register-transfer level data structure.

The process 700 includes generating 730 a software development kit for the integrated circuit based on the modified register-transfer level data structure. In some implementations, generating 730 the software development kit for the integrated circuit includes generating loaders for a Verilog simulator and a physical field programmable gate array to be flashed. For example, generating 730 the software development kit may include accessing an existing toolchain or software development kit for a template integrated circuit design that is identified by the design parameters data structure. The existing toolchain or software development kit (e.g., a RISC-V toolchain/SDK) may be set up using conventions suitable for configurability. For example, the existing toolchain or software development kit may be organized into submodules corresponding to design parameters of the design parameters data structure. For example, the software development kit may include a compiler, an assembler, header files, libraries, boot loaders, kernel drivers, and/or other tools for a fully functional SDK/computing environment. For example, generating 730 the software development kit may include executing a Python script. In some implementations, generating 730 the software development kit includes parsing the register-transfer level data structure (e.g., a JSON file), generating options for the tools and builds, generating header files responsive to a memory map, selecting appropriate examples from the existing toolchain or software development kit, generating relevant configuration files for target simulators (e.g., QEMU (Quick Emulator)) so they can run the new design on another processor (e.g., x86), and generating loaders for Verilog simulators and physical FPGA boards to be flashed. The resulting software development kit may be built and tested in the cloud (e.g., before giving to customer). For example, generating 730 the software development kit may include invoking a software development kit service with data based on the modified register-transfer level data structure and/or the design parameters data structure.

The process 700 includes generating 740 a physical design data structure (e.g., a physical design file) for the integrated circuit based on the modified register-transfer level data structure. For example, generating 740 a physical design data structure for the integrated circuit may include invoking a physical design service with data based on the modified register-transfer level data structure and/or the design parameters data structure. For example, generating 740 a physical design data structure for the integrated circuit may include invoking synthesis and place & route tools (e.g., Synopsys, Cadence, and/or Mentor tools). For example, generating 740 a physical design data structure for the integrated circuit may include performing logical equivalent checking. For example, generating 740 a physical design data structure for the integrated circuit may include invoking static timing analysis tools. For example, generating 740 a physical design data structure for the integrated circuit may include performing design rule checking (DRC) and/or layout versus schematic (LVS) checking. For example, generating 740 a physical design data structure for the integrated circuit may include determining power, performance, and area estimates for the resulting integrated circuit design and providing these estimates as feedback to a user (e.g., a user of a web client). For example, the physical design data structure may include in less-technical terms whether there are any issues with the physical design. For example, the physical design data structure may highlight important components of the output of the synthesis and place & route tools. For example, the physical design data structure may include a GDSII file or an OASIS file. For example, generating 740 a physical design data structure for the integrated circuit may include managing and orchestrating physical design toolchains in a cloud. For example, generating 740 a physical design data structure for the integrated circuit may include handling database movement from tool to tool, and managing access to third party IP cores. For example, generating 740 a physical design data structure for the integrated circuit may include accessing template designs, which may allow for significant design reuse. For example, generating 740 a physical design data structure for the integrated circuit may include identifying those combinations to reduce workload. For example, generating 740 a physical design data structure for the integrated circuit may provide better or more compact error/issue reporting, by translating tool issues into manageable feedback and providing the actual error/output of tools in a deliverable format to a user (e.g., a user of a web client). For example, generating 740 a physical design data structure for the integrated circuit may include using physical design blocks for identified pairings of functional blocks that may be reused across designs to improve efficiency.

The process 700 includes generating 750 documentation for the integrated circuit based on the modified register-transfer level data structure. For example, generating 750 documentation for the integrated circuit may include using Prince (available at https://www.princexml.com/). For example, generating 750 documentation for the integrated circuit may include using ASCII Doc (available at http://asciidoc.org/). For example, generating 750 documentation for the integrated circuit may include accessing a pre-loaded modular manual for a template integrated circuit design that is identified by the design parameters data structure. The modular manual may be set up using conventions suitable for configurability. For example, the modular manual may be organized into submodules corresponding to design parameters of the design parameters data structure. In some implementations, the modular manual is stored as multiple components in corresponding directories of an existing SDK for the template. Generating 750 documentation for the integrated circuit may include generalizing the pre-loaded modular manual to respond to values of design parameters in the design parameters data structure. For example, the generated 750 documentation may be in an HTML format and/or in a PDF format. In order to correctly document the memory map/ports, generating 750 documentation for the integrated circuit may include working with the post-RTL output. For example, generating 750 documentation for the integrated circuit may include utilizing a documentation framework similar to the React framework (e.g., a JS HTML framework). In some implementations, documentation blocks have a respective piece of python code that takes in an RTL output configuration file and breaks it down into the chunks that ASCII Doc requires and invokes content generation. For example, generating 750 documentation for the integrated circuit may include invoking a documentation service with data based on modified register-transfer level data structure and/or the design parameters data structure.

The process 700 includes generating 760 a field programmable gate array emulation data structure (e.g., a field programmable gate array emulation file) for the integrated circuit based on the modified register-transfer level data structure and the software development kit. For example, the field programmable gate array emulation data structure for the integrated circuit may be configured to utilize a cloud based field programmable gate array (FPGA). For example, generating 760 a field programmable gate array emulation data structure for the integrated circuit may include invoking a cloud based FPGA synthesis tool. For example, generating 760 a field programmable gate array emulation data structure for the integrated circuit may include invoking emulation platforms, such as, Palladium (from Cadence), Veloce (from Mentor Graphics), and/or Zebu (from Synopsys). For example, the field programmable gate array emulation data structure for the integrated circuit may be configured to handle emulating devices hard drives and network devices. For example, the field programmable gate array emulation data structure may include an emulation file and supporting materials. In some implementations, the field programmable gate array emulation data structure for the integrated circuit may provide for emulation of a whole system, including peripherals, operating together (e.g., memory timing needs to be matched). For example, the peripherals emulated may be the actual peripherals a user has selected in the web interface generated by a web application server. For example, generating 760 a field programmable gate array emulation data structure for the integrated circuit may include highly detailed use of existing tools based on the parameterized integrated circuit design. For example, generating 760 a field programmable gate array emulation data structure for the integrated circuit may include invoking the FPGA/Emulator toolchain, setting up the emulated devices, and compiling the emulated devices. For example, generating 760 a field programmable gate array emulation data structure for the integrated circuit may include invoking a FPGA/emulation service with data based on modified register-transfer level data structure and/or the design parameters data structure.

The process 700 includes generating 770 a test plan for an integrated circuit based on the design parameters data structure and acceptance criteria. In some implementations, the acceptance criteria are received with the design parameters data structure (e.g., received from a web client or received from a scripting API client). In some implementations, the acceptance criteria are read from memory (e.g., the memory 406). For example, generating 770 a test plan for an integrated circuit may include invoking Verilog simulators (e.g., open source Verilog simulators). For example, the test plan for an integrated circuit may include utilizing FPGAs. For example, the test plan for an integrated circuit may include utilizing software simulators, such as Quick Emulator (QEMU), Spike, and/or other software simulators. In some implementations, multiple target test platforms look the same so the test plan for an integrated circuit may include moving the workloads across different cost options (e.g., using physical FPGAs vs. cheaper using pre-emptible cloud instances). For example, a test plan for an integrated circuit may be generated 770 based on the modified register-transfer level data structure (e.g., including Verilog RTL), the software development kit, the physical design data structure (e.g., including a GDSII file), a corpus of tests, and corresponding acceptance criteria. In some implementations, generating 770 a test plan for an integrated circuit may include responding to varying acceptance criteria that are user-defined. Given acceptance criteria and a design configuration, a test plan may be generated 770 automatically. For example, generating 770 a test plan for an integrated circuit may include defining environments, filtering out tests that cannot be run given a corpus of tests and a hardware and software design generated based on the design parameters data structure, and generating the test plan to include a sequence of selected tests for the integrated circuit design. For example, an environment may define a test platform. There may be additional components in a test bench, outside the device under test, and it may be beneficial to standardize these environments across designs. For example, a way to end a test may be standardized within a test platform. Some test platforms may define a register a CPU can write to that is defined within the test bench, while some test platforms will wiggle a general purpose input/output (GPIO) pin in a certain way. Given a test plan, many test platforms may be used for all tests.

The process 700 includes invoking 780 tests for the integrated circuit based on the test plan, the modified register-transfer level data structure, the software development kit, and the physical design data structure to obtain a set of test results. For example, the invoked 780 verification tests may be executed directly by a controller, by a verification service, and/or by an external service (e.g., a cloud based FPGA or emulation service that is accessed via communications over a network). In some implementations, invoking 780 tests for the integrated circuit may include invoking a test using a field programmable gate array, programmed based on the field programmable gate array emulation data structure, to obtain an emulation result. The field programmable gate array may be operating on a cloud server. For example, invoking 780 tests for the integrated circuit may include using credentials (e.g., a login and/or password) to invoke the test on the field programmable gate array operating on a cloud server. For example, the test results may include summary information for a large number of tests, such as a binary indication of whether all acceptance criteria were met by the generated integrated circuit design, or a list of binary indications of whether individual verification tests were passed for respective verification tests included in the test plan.

The process 700 includes transmitting, storing, or displaying 790 a design data structure based on the modified register-transfer level data structure, the software development kit, the physical design data structure, and the test results. For example, the design data structure may be a collection of files, an archive, or a repository (e.g., a GitHub repository) that includes data from the modified register-transfer level data structure, the software development kit, the physical design data structure, and the test results. For example, the design data structure may also include the documentation generated 750 and/or the field programmable gate array emulation data structure generated 760. For example, the design data structure may be transmitted 790 to an external device (e.g., a personal computing device) for display or storage. For example, the design data structure may be stored 790 in memory (e.g., the memory 406). For example, design data structure may be displayed 790 in a user interface (e.g., the user interface 420). For example, the design data structure may be transmitted 790 via a network communications interface (e.g., the network communications interface 418).

Although the process 700 is shown as a series of operations for clarity, implementations of the process 700 or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted. For example, operation 750 may be omitted from the process 700.

Figure 8:
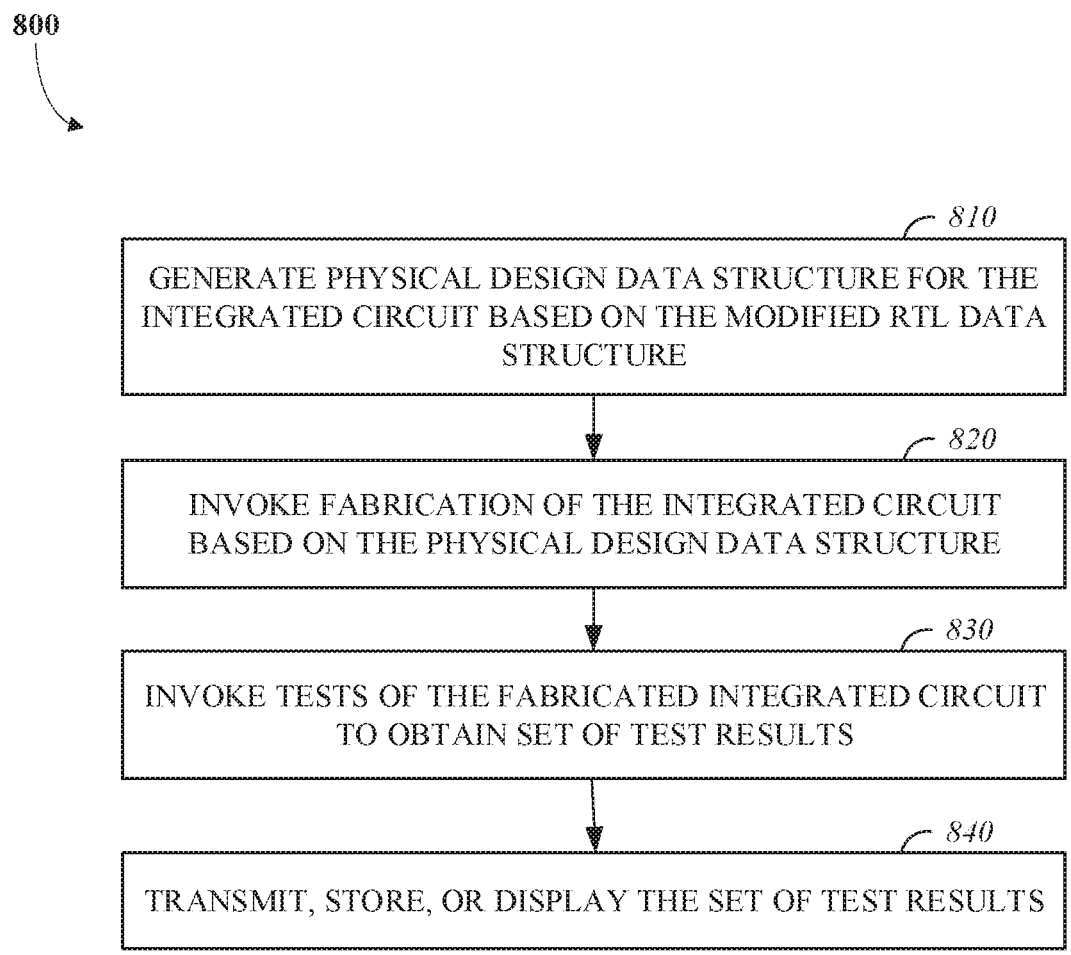
FIG. 8 is flow chart of an example of a process for fabricating and testing of an integrated circuit based on a modified register-transfer level data structure.

FIG. 8 is flow chart of an example of a process 800 for fabricating and testing of an integrated circuit based on a modified register-transfer level data structure. The process 800 includes generating 810 a physical design data structure for the integrated circuit based on the modified register-transfer level data structure; invoking 820 fabrication of the integrated circuit based on the physical design data structure; invoking 830 tests of the fabricated integrated circuit to obtain a set of test results; and transmitting, storing, or displaying 840 the set of test results. For example, the process 800 may be implemented by the integrated circuit design service infrastructure 310 of FIG. 3. For example, the process 800 may be implemented by the system 400 of FIG. 4. For example, the process 800 may be used to quickly incorporate a modular processor design with an input/output shell (e.g., the input/output shell of the integrated circuit design 100 of FIG. 1), including connecting modules of the design using automatically generated clock crossings, in a system-on-a-chip design that can be rapidly tested in silicon. This approach may reduce processor development time, reduce the costs of testing a design, and/or improve the quality of test results.

The process 800 includes generating 810 a physical design data structure for the integrated circuit based on a modified register-transfer level data structure (e.g., a modified register-transfer level data structure obtained using the process 500 of FIG. 5 or the process 600 of FIG. 6). For example, generating 810 a physical design data structure for the integrated circuit may include invoking a physical design service with data based on the modified register-transfer level data structure and/or the design parameters data structure. For example, generating 810 a physical design data structure for the integrated circuit may include invoking synthesis and place & route tools (e.g., Synopsys, Cadence, and/or Mentor tools). For example, generating 810 a physical design data structure for the integrated circuit may include performing logical equivalent checking. For example, generating 810 a physical design data structure for the integrated circuit may include invoking static timing analysis tools. For example, generating 810 a physical design data structure for the integrated circuit may include performing design rule checking (DRC) and/or layout versus schematic (LVS) checking. For example, generating 810 a physical design data structure for the integrated circuit may include determining power, performance, and area estimates for the resulting integrated circuit design and providing these estimates as feedback to a user (e.g., a user of a web client). For example, the physical design data structure may include in less-technical terms whether there are any issues with the physical design. For example, the physical design data structure may highlight important components of the output of the synthesis and place & route tools. For example, the physical design data structure may include a GDSII file or an OASIS file. For example, generating 810 a physical design data structure for the integrated circuit may include managing and orchestrating physical design toolchains in a cloud. For example, generating 810 a physical design data structure for the integrated circuit may include handling database movement from tool to tool, and managing access to third party IP cores. For example, generating 810 a physical design data structure for the integrated circuit may include accessing template designs, which may allow for significant design reuse. For example, generating 810 a physical design data structure for the integrated circuit may include identifying those combinations to reduce workload. For example, generating 810 a physical design data structure for the integrated circuit may provide better or more compact error/issue reporting, by translating tool issues into manageable feedback and providing the actual error/output of tools in a deliverable format to a user (e.g., a user of a web client). For example, generating 810 a physical design data structure for the integrated circuit may include using physical design blocks for identified pairings of functional blocks that may be reused across designs to improve efficiency.

The process 800 includes invoking 820 fabrication of the integrated circuit based on the physical design data structure. In some implementations, a physical design specification (e.g., a GDSII file) based on a physical design data structure for the integrated circuit is transmitted via a network (e.g., the network 306) to a manufacturer server (e.g., the manufacturer server 330) to invoke 820 fabrication of the integrated circuit (e.g., using manufacturing equipment of the associated manufacturer). For example, the manufacturer server 330 may host a foundry tape out website that is configured to receive physical design specifications (e.g., as a GDSII file or an OASIS file) to schedule or otherwise facilitate fabrication of integrated circuits. In some implementations, fabrication of the integrated circuit may be invoked 820 by direct control of manufacturing equipment (e.g., via communication over a bus or serial port).

The process 800 includes invoking 830 tests of the fabricated integrated circuit to obtain a set of test results. The tests may be performed in the same facility as the fabrication, or the integrated circuit may be physically transferred (e.g., via mail) to another facility for testing. The integrated circuit may be connected to testing apparatus, which may be controlled to invoke 830 tests of the fabricated integrated circuit. For example, invoking 830 tests of the fabricated integrated circuit to obtain a set of test results may include transmitting commands, including parts of a test plan for the integrated circuit, to a cloud-based server (e.g., the silicon testing server 340) controlling the testing apparatus.

The process 800 includes transmitting, storing, or displaying 840 the set of test results. For example, the set of test results may be transmitted 840 to an external device (e.g., a personal computing device) for display or storage. For example, the set of test results may be stored 840 in memory (e.g., the memory 406). For example, set of test results may be displayed 840 in a user interface (e.g., the user interface 420). For example, the set of test results may be transmitted 840 via a network communications interface (e.g., the network communications interface 418).

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. For example, a non-transitory computer-readable storage medium may include executable instructions that, when executed by a processor, cause performance of an operations to implement the process 500 of FIG. 5 or the process 600 of FIG. 6.

Appendix A below is an example of a code snippet in the Scala language that can used as part of an implementation of a interface for automatically generating clock crossings in a an integrated circuit design. For example, the code snippet of the Appendix A may be used as part of an implementation of an interface that can be used to perform the process 500 of FIG. 5 or the process 600 of FIG. 6. Appendix B below is an example of a code snippet in the Scala language that can used to facilitate automatically generating a clock crossing between processing core and system bus in different clock domains. Appendix C below is an example of a code snippet in the Scala language that can used to facilitate automatically generating a clock crossing between two buses in different clock domains.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

APPENDIX A

```
package freechips.rocketchip.tilelink
import freechips.rocketchip.config.Parameters
import freechips.rocketchip.diplomacy._
import freechips.rocketchip.util.RationalDirection
case class TLInwardCrossingHelper(name: String, scope: LazyScope, node:
  TLInwardNode){
  def apply(xing:  ClockCrossingType=NoCrossing)(implicit p: Parameters):
  TLInwardNode={
  xing match {
    case AsynchronousCrossing(depth, sync)=>
      node:*=* scope TLAsyncCrossingSink(depth, sync):*=*
  TLAsyncNameNode(name): *=* TLAsyncCrossingSource(sync)
    case RationalCrossing(direction)=>
      node:*=* scope TLRationalCrossingSink(direction.flip):*=*
  TLRationalNameNode(name): *=* TLRationalCrossingSource( )
    case SynchronousCrossing(buffer)=>
      node:*=* scope TLBuffer(buffer):*=* TLNameNode(name)
    }
  }
}
case class TLOutwardCrossingHelper(name: String, scope: LazyScope, node:
  TLOutwardNode){
  def apply(xing:  ClockCrossingType=NoCrossing)(implicit p: Parameters):
  TLOutwardNode={
  xing match {
    case AsynchronousCrossing(depth, sync)=>
      TLAsyncCrossingSink(depth, sync):*=* scope TLAsyncNameNode(name):*=*
  TLAsyncCrossingSource(sync):*=* node
    case RationalCrossing(direction)=>
      TLRationalCrossingSink(direction):*=* scope TLRationalNameNode(name):*=*
  TLRationalCrossingSource( ):*=* node
    case SynchronousCrossing(buffer)=>
      scope {TLNameNode(name):*=* TLBuffer(buffer): *=* node
    }
  }
}
```

APPENDIX B

```
protected def connectMasterPortsToSBus(tile: BaseTile, crossing: RocketCrossingParams){
```

```
sbus.fromTile(tile.tileParams.name, crossing.masterbuf-
fers){
  crossing. master. cork
    .map {u=>TLCacheCork(unsafe=u)}
    .map{_:=* tile.crossMasterPort( )}
    .getOrElse {tile.crossMasterPort( )}
  }
}
```

APPENDIX C

```
/**Example Top with periphery devices and ports, and a
Rocket subsystem*/
  class ExampleRocketSystem(implicit p: Parameters)
extends RocketSubsystem
  with HasAsyncExtlnterrupts
  with CanHaveMasterAXI4MemPort
  with CanHaveMasterAXI4MMIOPort
  with CanHaveSlaveAXI4Port
  with HasPeripheryBootROM{
  override lazy val module=new ExampleRocketSystem-
ModuleImp(this)
  // The sbus masters the cbus; here we convert TL-UH-
>TL-UL
    sbus.crossToBus(cbus, NoCrossing)
  // The cbus masters the pbus; which might be clocked
slower
    cbus.crossToBus(pbus, SynchronousCrossing( ))
  // The fbus masters the sbus; both are TL-UH or TL-C
    FlipRendering implicit p=>
    sbus.crossFromBus(fbus, SynchronousCrossing( ))
  }
  // The sbus masters the mbus; here we convert TL-C-
>TL-UH
    private val BankedL2Params(nBanks, coherenceMan-
ager)=p(BankedL2Key)
    private val (in, out, halt)=coherenceManager(this)
    if (nBanks !=0){
    sbus.coupleTo("coherence manager") {in:*=}
    mbus.coupleFrom("coherence manager"){_:=* Bank-
        Binder(mbus.blockBytes*(nBanks-1)):*=out}
    }
}
```

What is claimed is:

1. A method comprising:
accessing a register-transfer level data structure for an integrated circuit design;
receiving a command to generate a clock crossing between a first module of the register-transfer level data structure and a second module of the register-transfer level data structure;
responsive to the command, automatically determining a signaling protocol identifier for the clock crossing based on data of the second module;
responsive to the command, automatically determining a directionality for the clock crossing based on data of the second module; and
responsive to the command, automatically generating the clock crossing between the first module and the second module based on the signaling protocol identifier and based on the directionality to obtain a modified register-transfer level data structure.

2. The method of claim 1, comprising:
responsive to the command, automatically determining a clock crossing type for the clock crossing based on a clock frequency of the first module and based on a clock frequency of the second module, wherein the clock crossing is automatically generated based on the clock crossing type.

3. The method of claim 1, wherein the command includes a parameter specifying a clock crossing type and the clock crossing is automatically generated based on the clock crossing type specified by the command.

4. The method of claim 1, wherein automatically generating the clock crossing comprises:
using an implicit class that is invoked using the signaling protocol identifier.

5. The method of claim 1, wherein the second module is a bus module.

6. The method of claim 1, wherein the first module and the second module are both bus modules.

7. The method of claim 1, wherein the command is a first command and the clock crossing is a first clock crossing, and comprising:
receiving a second command to generate a second clock crossing between the first module of the register-transfer level data structure and a third module of the register-transfer level data structure;
responsive to the second command, automatically determining a signaling protocol identifier for the second clock crossing based on data of the third module;
responsive to the second command, automatically determining a directionality for the second clock crossing based on data of the third module; and
responsive to the second command, automatically generating the second clock crossing between the first module and the third module based on the signaling protocol identifier for the second clock crossing and based on the directionality for the second clock crossing to obtain the modified register-transfer level data structure, wherein the second clock crossing has different clock crossing type than the first clock crossing.

8. The method of claim 1, wherein the first module includes an IP core and the second module is a component of an input/output shell for a system-on-a-chip design.

9. The method of claim 1, comprising:
generating a physical design data structure for the integrated circuit based on the modified register-transfer level data structure;
invoking fabrication of the integrated circuit based on the physical design data structure;
invoking tests of the fabricated integrated circuit to obtain a set of test results; and
transmitting, storing, or displaying the set of test results.

10. The method of claim 1, comprising:
generating a physical design data structure for the integrated circuit based on the modified register-transfer level data structure;
generating a software development kit for the integrated circuit based on the modified register-transfer level data structure;
generating a test plan for the integrated circuit;
invoking tests for the integrated circuit based on the test plan, the modified register-transfer level data structure, the software development kit, and the physical design data structure to obtain a set of test results; and
transmitting, storing, or displaying a design data structure based on the modified register-transfer level data structure, the software development kit, the physical design data structure, and the test results.

11. A system comprising:
a network interface;
a memory; and a processor, wherein the memory includes instructions executable by the processor to cause the system to:
- access a register-transfer level data structure for an integrated circuit design;
- receive a command to generate a clock crossing between a first module of the register-transfer level data structure and a second module of the register-transfer level data structure;
- responsive to the command, automatically determine a signaling protocol identifier for the clock crossing based on data of the second module; and
- responsive to the command, automatically generate the clock crossing between the first module and the second module based on the signaling protocol identifier to obtain a modified register-transfer level data structure.

12. The system of claim 11, wherein the memory includes instructions executable by the processor to cause the system to:
- responsive to the command, automatically determine a clock crossing type for the clock crossing based on a clock frequency of the first module and based on a clock frequency of the second module, wherein the clock crossing is automatically generated based on the clock crossing type.

13. The system of claim 11, wherein the command includes a parameter specifying a clock crossing type and the clock crossing is automatically generated based on the clock crossing type specified by the command.

14. The system of claim 11, wherein automatically generating the clock crossing comprises:
- using an implicit class that is invoked using the signaling protocol identifier.

15. The system of claim 11, wherein the second module is a bus module.

16. The system of claim 11, wherein the first module and the second module are both bus modules.

17. The system of claim 11, wherein the command is a first command and the clock crossing is a first clock crossing, and the memory includes instructions executable by the processor to cause the system to:
- receive a second command to generate a second clock crossing between the first module of the register-transfer level data structure and a third module of the register-transfer level data structure;
- responsive to the second command, automatically determine a signaling protocol identifier for the second clock crossing based on data of the third module; and
- responsive to the second command, automatically generate the second clock crossing between the first module and the third module based on the signaling protocol identifier for the second clock crossing to obtain the modified register-transfer level data structure, wherein the second clock crossing has different clock crossing type than the first clock crossing.

18. The system of claim 11, wherein the first module includes an IP core and the second module is a component of an input/output shell for a system-on-a-chip design.

19. A non-transitory computer-readable storage medium that includes instructions that, when executed by a processor, facilitate performance of operations comprising:
- accessing a register-transfer level data structure for an integrated circuit design;
- receiving a command to generate a clock crossing between a first module of the register-transfer level data structure and a second module of the register-transfer level data structure;
- responsive to the command, automatically determining a directionality for the clock crossing based on data of the second module; and
- responsive to the command, automatically generating the clock crossing between the first module and the second module based on the directionality to obtain a modified register-transfer level data structure.

20. The non-transitory computer-readable storage medium of claim 19, wherein the instructions include instructions that, when executed by a processor, facilitate performance of operations comprising:
- responsive to the command, automatically determining a clock crossing type for the clock crossing based on a clock frequency of the first module and based on a clock frequency of the second module, wherein the clock crossing is automatically generated based on the clock crossing type.

* * * * *